F. V. PHILLIPS.
SHOCK ABSORBER.
APPLICATION FILED JAN. 19, 1914.
1,134,223.
Patented Apr. 6, 1915.
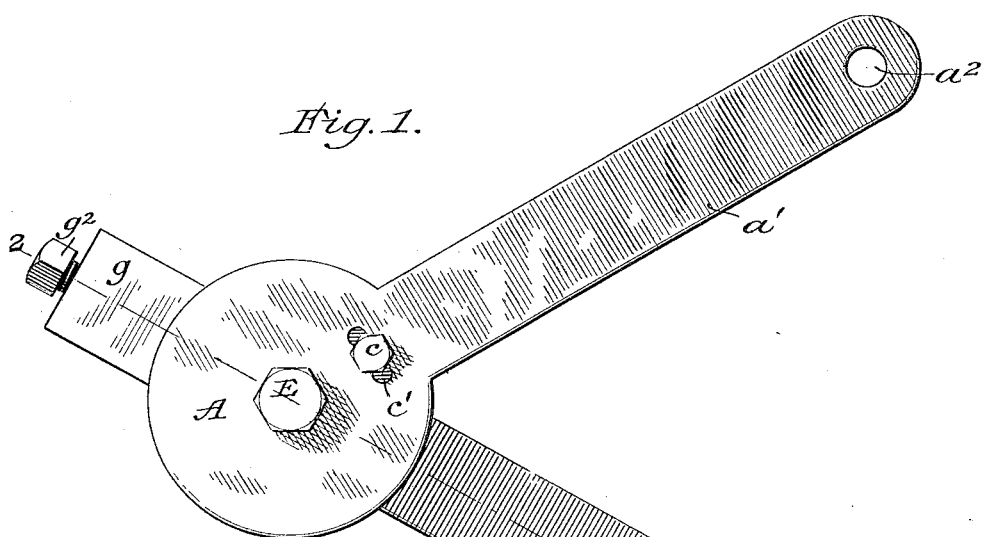
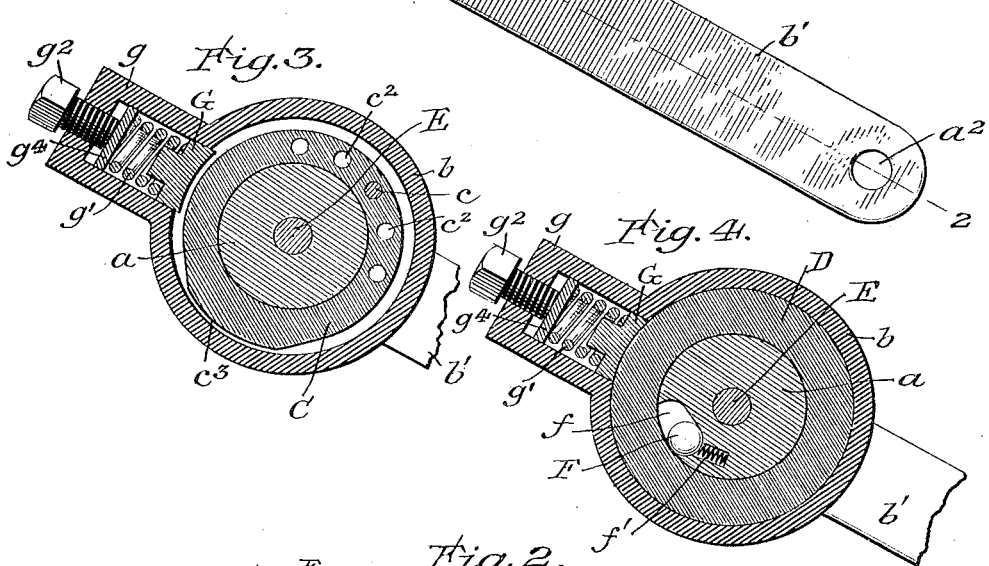
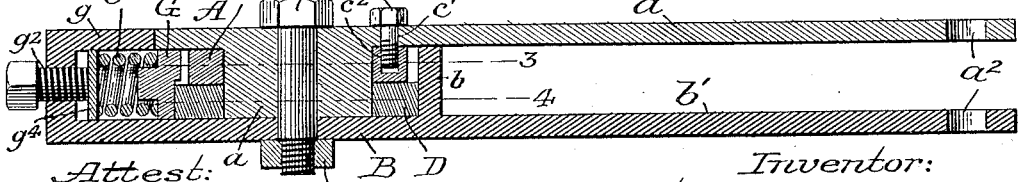
Attest:
Annie Cooper
Geo. E. Tew
Inventor:
Francis V. Phillips,
By Howell Battle
Attorney.

UNITED STATES PATENT OFFICE.

FRANCIS V. PHILLIPS, OF ORLANDO, FLORIDA.

SHOCK-ABSORBER.

1,134,223.

Specification of Letters Patent.

Patented Apr. 6, 1915.

Application filed January 19, 1914. Serial No. 812,959.

*To all whom it may concern:*

Be it known that I, FRANCIS V. PHILLIPS, a citizen of the United States, residing at Orlando, in the county of Orange and State of Florida, have invented new and useful Improvements in Shock-Absorbers, of which the following is a specification.

My invention relates to shock absorbers for use on automobiles or other vehicles, its main object being to provide an efficient device of simple construction which will absorb shocks incident to violent compressions or reactions of the vehicle springs.

Another object of the invention is to provide a device which will permit the vehicle springs to be freely compressed to a certain limit, but which will resist compression beyond such limit, and which will resist the rebound from any degree of compression. Still another object of my invention is to provide for readily adjusting the device so that it will resist compression of the springs at the point desired.

With these objects in view my invention consists in the features hereinafter described and particularly pointed out in the appended claims.

Referring to the drawings forming part of this specification: Figure 1 is a side elevation of a device embodying my invention. Fig. 2 is a central section thereof on line 2—2 of Fig. 1, the two arms of the device being in substantial alinement. Fig. 3 is a sectional view taken on line 3 of Fig. 2, and Fig. 4 is a sectional view taken on line 4 of Fig. 2.

The shock absorber illustrated in the drawings comprises two substantially circular members A and B forming two sides of a closed receptacle, the annular wall of this receptacle being formed by a flange $b$ on the member B. The member A is provided with a central hub $a$ forming a bearing for two rings C and D, said hub being centrally perforated to receive a bolt E, which bolt also passes through a central perforation to the member B, and which together with the nut $e$ serves to pivotally connect the two members A and B together.

The member A is provided with an arm $a'$, and the member B with an arm $b'$. These two arms are each provided at their outer ends with a hole $a^2$ by means of which one of said arms may be pivotally secured to the body of the vehicle and the other pivotally secured to the vehicle axle or running gear. The means by which the device is secured to the vehicle, and its particular location thereon is immaterial to this invention, it being understood that it is or may be applied to the vehicle like other similar devices.

Referring to Fig. 4, it will be seen that the hub $a$ of the member A is recessed, as at $f$, for the reception of a ball F, said recess having its rear wall slightly inclined so that when the members A and B are rotated by a movement of the arms $a'$ and $b'$ away from each other, the ball F will be forced outwardly against the ring D and operate to lock said ring to the hub $a$. When the members A and B are rotated in an opposite direction the ball F will release its engagement with the ring D, this being a well known form of clutch which causes the ring D to travel with the member A when the latter is rotated in one direction, and leaves said member free to rotate in the opposite direction independently of said ring. The ball F is backed by a small spring $f'$ which holds the ball F in rolling contact with the ring D to insure prompt clutching action, as will be readily understood. The ring D is normally engaged by a friction block G, which is slidably mounted in a chambered extension $g$ of the member B. Said block G is forced in frictional engagement with the ring D by means of a strong spiral spring $g'$ mounted behind said block in said chambered extension, the tension of said spring being adjusted by means of a screw $g^2$. The screw $g^2$ is tapped in the rear wall of the extension $g$, and presses against a disk or washer $g^4$ which is interposed between said screw and the spring $g'$ as clearly illustrated in Figs. 2 and 4.

It will now be understood that when the springs of the vehicle are compressed, as by a sudden jolt, the two arms $a'$ and $b'$ will be moved toward each other, and that when said arms start to move outwardly by the recoil, the ball clutch F will operate to lock the ring D to the member A so that such outward movement will be resisted by the pressure of the friction block G against said ring D. The ring C, which is also mounted on the hub $a$ of the member A, is adjustably secured to said member by means of a screw $c$ which passes through a slot $c'$ in the member A, and which engages one of a series of threaded holes $c^2$ in the ring C, as clearly shown in Figs. 1 and 2. The outer surface of the ring C is so formed that it will engage the friction block G at a predetermined point in the relative rotation of the two members A and B, said ring being provided with a cam surface $c^3$ which frictionally engages the block G at a point in the relative rotation of the two members A and B which is determined by the adjustment of the ring C with respect to the member A. As shown in Fig. 2, the friction block G is made of a width sufficient to extend across both of the rings C and D, and is provided with two bearing surfaces which are offset with relation to each other, one of which engages the ring D, and the other of which is adapted to be engaged by the cam surfaces $c^3$ of the ring C.

The adjustment of the ring C with respect to the member A is determined by the maximum load to be carried by the vehicle to which the device is applied. After the device is secured to the vehicle, it is adjusted by loading the vehicle to the desired maximum load. Pressure on the friction block G being released by turning the screw $g^2$, the ring C is adjusted so that its cam surface $c^3$ will engage said block. This is accomplished by removing the connecting screw $c$ and turning said ring by means of any small tool which will engage said ring through the slot $c'$. When the ring is properly adjusted it is locked to the member A by means of the screw $c$ as already described. The screw $g^2$ is now turned until pressure of the friction block G on the ring D is sufficient to hold the vehicle springs in their compressed condition after the removal of the maximum load. The screw $g^2$ is now gradually retracted until the frictional pressure is just sufficient to allow the vehicle springs to open or expand to their desired normal position.

When the vehicle springs are suddenly compressed, as for instance when the vehicle passes over a rock or other obstruction, excessive compression is resisted by the cam surface $c^3$ on the ring C, coming in contact with the friction block G, the two members of the spring being thus prevented from coming in contact with each other, but it will be noted that moderate compression of the vehicle spring is not resisted. Any sudden recoil of the spring will be resisted by the ring D which will turn with the member A, against the friction block G whenever the two arms $a'$ and $b'$ of the device are moved outwardly by the rebound or recoil of the vehicle springs, the frictional resistance being readily regulated to suit requirements as already explained. It will also be noticed that the friction ring D is moved by the ball clutch F in one direction only, so that a new surface is constantly being presented to the friction block G. This insures an even wear on the entire surface of the friction ring D.

Having described my invention, what I claim as new and desire to secure by Letters Patent, is—

1. A shock absorber comprising two pivotally connected members, a friction element carried by one of said members, and a ring pivotally secured to the other of said members and surrounding their pivotal connection, said ring being normally out of engagement with said frictional element and being adapted to engage therewith at a predetermined point in the relative movement of the two members.

2. A shock absorber comprising two pivotally connected members, a ring surrounding the pivotal connection of said members, a spring pressed friction block carried by one of said members and adapted to frictionally engage the periphery of said ring, and a clutch carried by the other of said members, said clutch being adapted to engage and lock said ring to said member, when the two members are moved relatively to each other in one direction.

3. A shock absorber comprising two pivotally connected members, one of which is provided with a hub, two rings mounted on said hub, one of said rings being adjustably secured to said hub carrying member and being provided with a cam surface, a clutch carried by said hub adapted to lock the other ring thereto when the two members are moved relatively to each other in one direction, a spring pressed friction block carried by the other of said members, said block being normally in frictional engagement with said last mentioned ring, and being adapted to be frictionally engaged by the cam surface of the first mentioned ring.

4. A shock absorber comprising two pivotally connected members forming two sides of a closed receptacle, one of said members being provided with a flange forming the peripheral wall of said receptacle, and the other of said members being provided with an inwardly projecting hub, the flanged member being also provided with a chambered extension, a friction block slidably mounted in said chambered extension, a spring operating to press said block toward said hub, a ring surrounding said hub and frictionally engaging said block, a clutch carried by said hub and adapted to lock said ring thereto when said members are moved in one direction relatively to each other, and a cam ring adjustably mounted on said hub and adapted to frictionally engage said block at a predetermined point in the relative movements of said members in the opposite direction.

In testimony whereof I have hereunto set my hand in presence of two subscribing witnesses.

FRANCIS V. PHILLIPS.

Witnesses:
  GEO. N. PHILLIPS,
  S. Y. WAY.